Feb. 5, 1963 L. REICHOLD 3,076,223
DETACHABLE HANDLE
Filed March 22, 1960 2 Sheets-Sheet 1
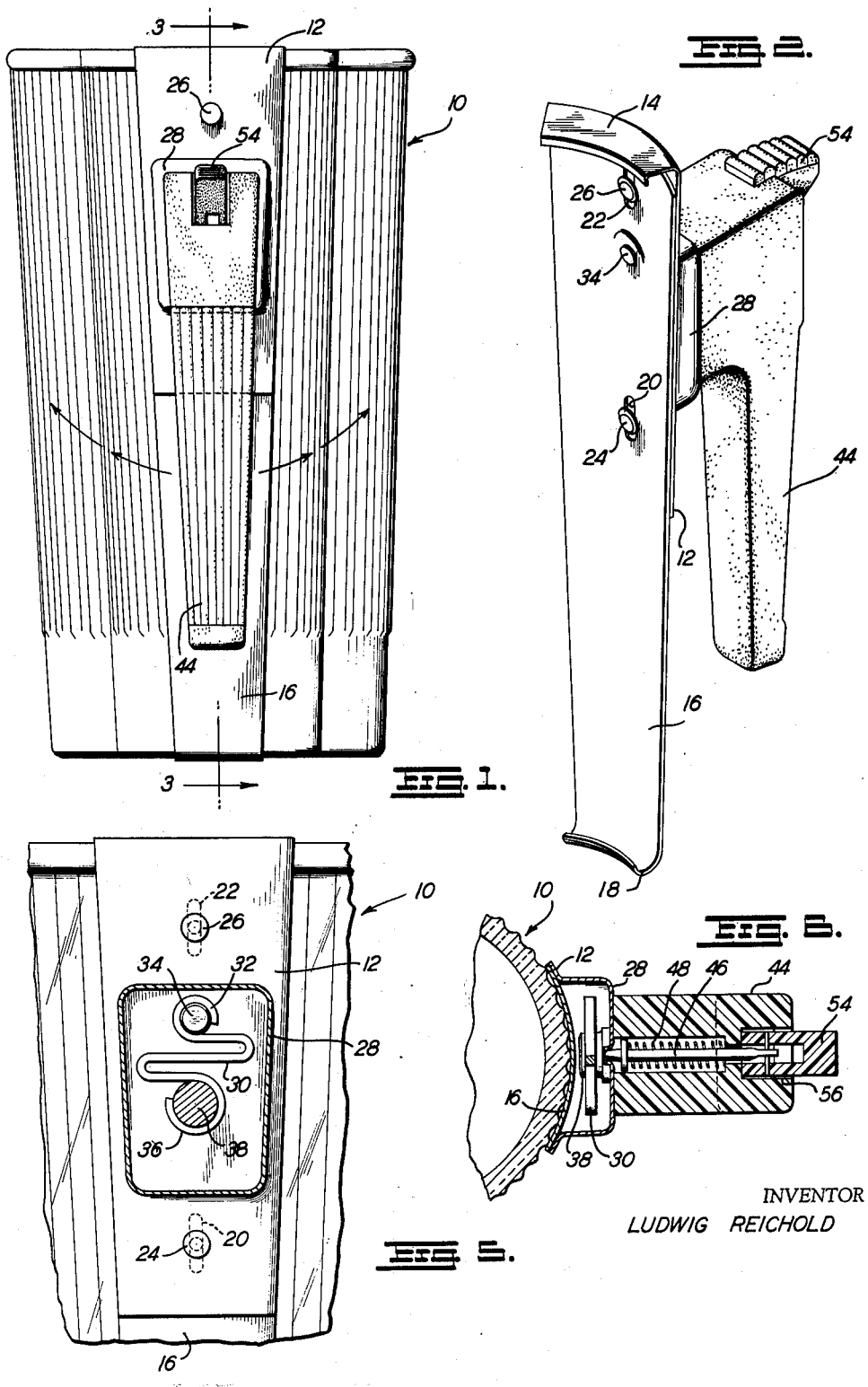
INVENTOR
LUDWIG REICHOLD

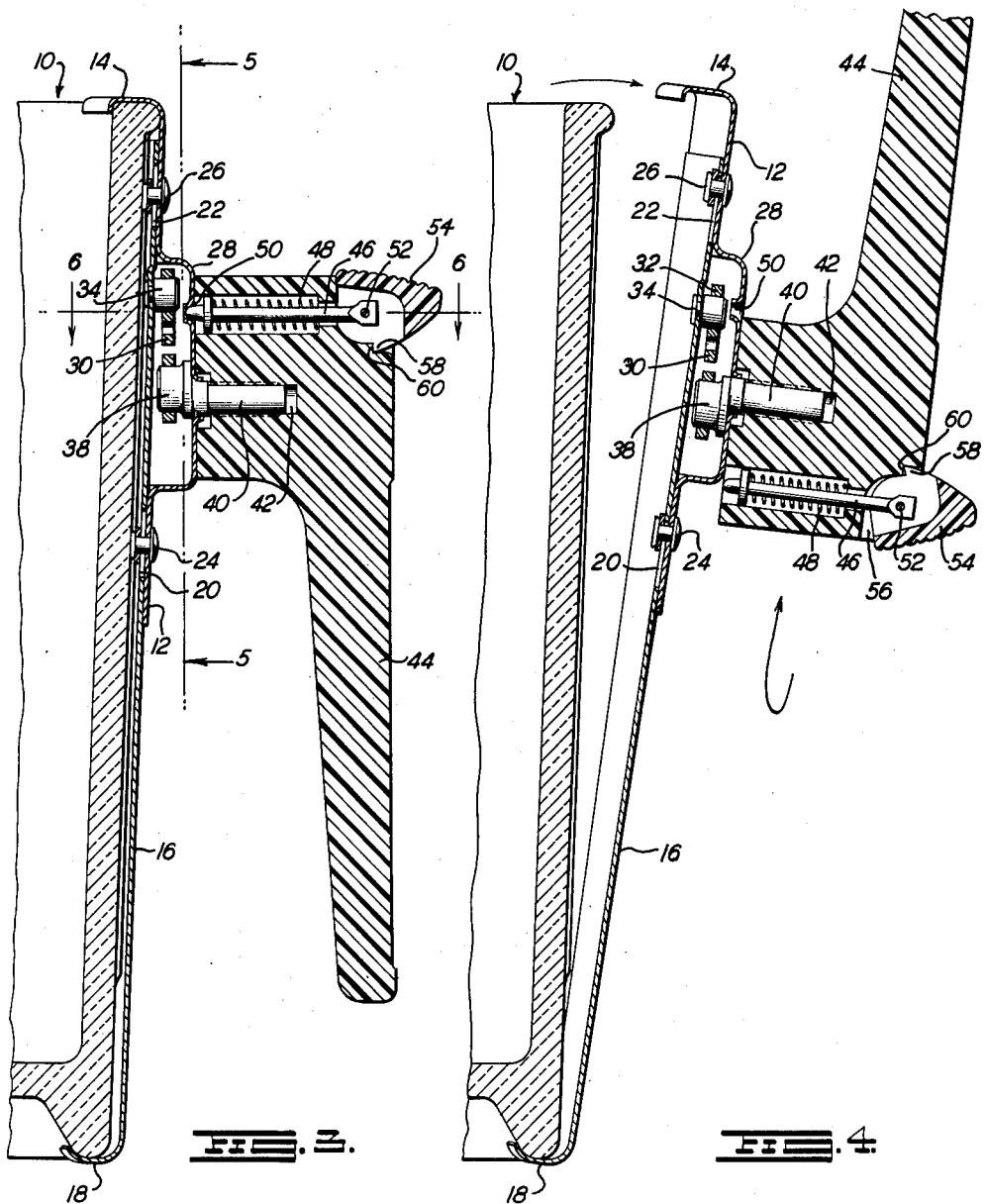

United States Patent Office 3,076,223
Patented Feb. 5, 1963

3,076,223
DETACHABLE HANDLE
Ludwig Reichold, Simsbury, Conn., assignor to Dynamics Corporation of America, New York, N.Y., a corporation of New York
Filed Mar. 22, 1960, Ser. No. 16,850
10 Claims. (Cl. 16—114)

The present invention relates to improvements in detachable handle devices for supporting various kinds of articles and is concerned more particularly with detachable handles adapted for use with containers, such as removable jars which are employed in electric motor driven blenders.

The invention has for its general object the provision of a detachable handle device of extreme simplicity and durability and which is further characterized by positive gripping action when attached to the article to be supported.

A more particular object of the invention is to provide a handle including a clamp which is actuated for article engaging and disengaging positions by rotary movement of the handle itself thus avoiding the use of separate levers or other elements for actuation purposes.

Another particular object is to provide a handle and article engaging and disengaging clamp wherein the clamp actuating mechanism is protectively concealed within the device whereby to provide a detachable handle of conventional and pleasing appearance and which may be washed or cleaned without harm to its actuating mechanism.

Other objects and advantages will be apparent from the following detailed description taken in conjunction with the accompanying drawings wherein a preferred embodiment of the principles of the invention has been selected for exemplification.

In the drawings:

FIG. 1 is a side elevational view of a detachable handle constructed in accordance with the invention and shown in attached supporting position upon an article;

FIG. 2 is a perspective view of the detachable handle shown in FIG. 1;

FIG. 3 is a fragmentary sectional view taken on the lines 3—3 of FIG. 1;

FIG. 4 is a view similar to FIG. 3 but showing the handle in article disengaging position;

FIG. 5 is a sectional view taken on the lines 5—5 of FIG. 3 and looking in the direction of the arrows; and FIG. 6 is a sectional view taken on the lines 6—6 of FIG. 3 and looking in the direction of the arrows.

Referring more particularly to the drawings, wherein like numerals refer to like parts, the specific article indicated at its entirety at 10 is a blender jar of the character shown in Patent No. 2,109,501, for example, and used in the device marketed as the Waring Blendor but it is to be understood that the jar 10 is merely illustrative of a great variety of other containers or articles to which the detachable handle of the present invention may be applied. The clamp or article engaging portion of the device is composed of telescopic sections in the form of an upper plate or strap 12 having a lateral lip 14 for engaging the upper edge of the article and a lower strap or plate 16 having a lateral lip 18 for engaging the opposed lower end of the article. The lower plate 16, as shown, is provided with elongated slots 20 and 22 through which rivets 24 and 26, preferably provided with washers, extend slidably to interconnect the plates 12 and 16 for telescoping action in contracted article engaging position, such as indicated in FIG. 3, and in extended article disengaging position as indicated in FIG. 4.

The upper plate or strap 12 is formed with a housing portion 28 for receiving a compressible power spring as shown at 30 the upper arcuate end 32 of which is supported by power spring stud 34. The lower arcuate end 36 of the power spring 30 is adapted to embrace an eccentric pin 38 having a shank 40 which projects outwardly of the housing 28 and is keyed in a bore 42 provided in the handle element which is indicated at 44. It will be apparent that the shank 40 and bore 42 provide a pivotal axis for rotary movement of the handle 44.

The handle 44 is locked in its upright operative position and the telescoping plates 12 and 16 are locked in contracted article gripping position by a lock-pin 46 which is normally spring pressed as shown at 48 into locking engagement with a seat 50 formed in the outer wall of housing 28. The lock-pin 46 is actuated by a ribbed button 54 which carries in its slotted central portion a cross-pin 52 to which the outer extremity of the lock-pin 46 is secured thus to support the button 54 in a recess 56 formed in the handle 44. The button 54 is adapted to rock or pivot in the recess 56 at the point where a shoulder 58 formed integrally with the button engages a notched seat 60 formed in the handle recess.

The actuating arrangement is such that when the button 54 is thumb pressed outwardly on its pivot against the tension of spring 48 the lock-pin 46 is withdrawn from its seat 50 and the handle may then be turned in either direction 360° while the inner extremity of the lock-pin 46 rides over the surface of the housing 28. As the handle is turned to upright position as shown in FIG. 4 the eccentric pin 38 tends to rotate against the power spring 30 to its lowermost position as also shown in FIG. 4 thus to slide the article gripping members 12 and 16 into extended article disengaging position. As turning of the handle 44 is continued or reversed to its normal downward position the eccentric pin 38 through the power spring 30 will return the gripping members 12 and 16 to contracted article engaging position and, when the lock-pin 46 reaches its seat 50, the spring 48 will abruptly thrust the pin into locking engagement with the seat thus to lock the handle to the article.

It will be apparent that the sole operating means for the device is the handle member 44 which accordingly performs a two-fold function. It will also be apparent that the article clamp actuating parts including the eccentric pin 38, power spring 30 and lock-pin 46 are concealed within the device so that the detachable handle presents the exterior appearance of a conventional permanent handle and also is capable of being washed or otherwise cleaned without harm to its actuating mechanism.

It is to be understood that the present invention is not confined to the particular construction and arrangement of parts herein illustrated and described but embraces all such modifications thereof as come within the scope of the following claims.

I claim:

1. A detachable handle device comprising, a pair of elongated article engaging plates, article engaging means carried by opposed ends of said plates means for holding said plates in longitudinally relatively slidable relationship for engagement of the article when in contracted position and for release of the article when in extended position, a handle member, means for pivotally attaching said handle member to one of said plates and means connected between said plates for relatively sliding said plates upon rotary movement of said handle.

2. A detachable handle device comprising, a pair of elongated article engaging plates, article engaging means carried by opposed ends of said plates, the said plates being longitudinally relatively slidable for engagement of the article when in contracted position and for release of the article when in extended position, a handle member pivotally attached to one of said plates, means connected between said plates for relatively sliding said plates upon rotary movement of said handle and means carried by the device for locking said plates in contracted position.

3. A detachable handle device comprising, a pair of elongated article engaging plates, article engaging means carried by opposed ends of said plates, the said plates being longitudinally relatively slidable for engagement of the article when in contracted position and for release of the article when in extended position, a handle member pivotally attached to one of said plates, means connected between said plates for relatively sliding said plates upon rotary movement of said handle, the said device including a housing, and the said means being disposed within said housing.

4. A detachable handle device comprising, a handle, article engaging clamping means pivotally connected to said handle so that said handle is rotatable transversely of said clamping means, the said clamping means being adjustable in one position to engage an article and in another position to release the article and means for adjusting said clamping means upon said rotary movement of said handle.

5. A detachable handle device comprising, a handle, article engaging clamping means pivotally connected to said handle so that said handle is rotatable transversely of said clamping means, the said clamping means being adjustable in one position to engage an article and in another position to release the article, means for adjusting said clamping means upon said rotary movement of said handle, the said device including a housing and the said adjusting means being disposed within said housing.

6. A detachable handle device comprising, a handle, article engaging clamping means pivotally connected to said handle so that said handle is rotatable transversely of said clamping means, the said clamping means being adjustable in one position to engage an article and in another position to release the article, means for adjusting said clamping means upon said rotary movement of said handle and spring pressed means carried by said handle for locking said clamping means in article engaging position.

7. A detachable handle device comprising, a handle, article engaging clamping means pivotally connected to said handle so that said handle is rotatable transversely of said clamping means, a housing carried by said clamping means and means for adjusting said clamping means disposed within said housing, the said handle being operably connected to said clamping adjusting means whereby to operate said clamping adjusting means upon said rotary movement of said handle.

8. A detachable handle device comprising, a handle, a pair of article engaging plates, article engaging means carried by opposed ends of said plates, means for holding said plates in longitudinally relatively slidable relationship for engagement of the article when in contracted position and for release of the article when in extended position, a housing carried by one of said plates, spring means carried by the other of said plates and disposed within said housing, eccentric means in operative engagement with said spring means, the said eccentric means including a shaft, the said shaft extending outwardly of said housing and supporting said handle to provide an axis for rotary movement of said handle, the said spring means and eccentric means being operable upon rotary movement of said handle relatively to slide said article engaging plates.

9. The device of claim 8 additionally including means for locking the handle to the article engaging plates when in contracted article engaged position.

10. The device of claim 8 wherein the locking means is a spring pressed locking pin carried interiorly of said handle and engageable with a seat carried by said housing.

References Cited in the file of this patent
UNITED STATES PATENTS

| | | |
|---|---|---|
| 1,240,427 | Dougherty | Sept. 18, 1917 |
| 2,010,317 | Olson | Aug. 6, 1935 |
| 2,262,339 | Shaffer | Nov. 11, 1941 |
| 2,808,285 | Robuck | Oct. 1, 1951 |
| 2,742,315 | Dreier | Apr. 17, 1956 |
| 2,905,500 | Thombs | Sept. 22, 1959 |